UNITED STATES PATENT OFFICE.

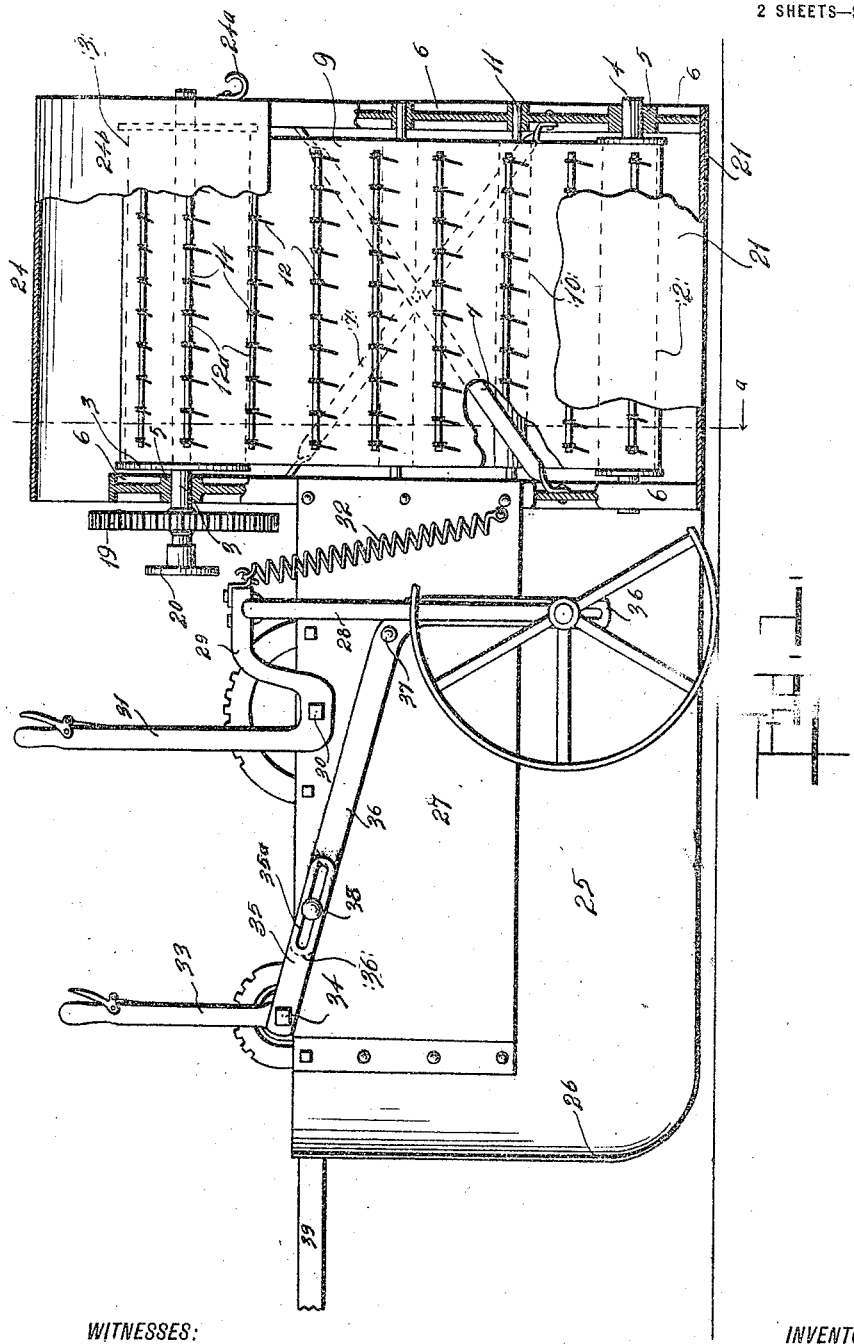

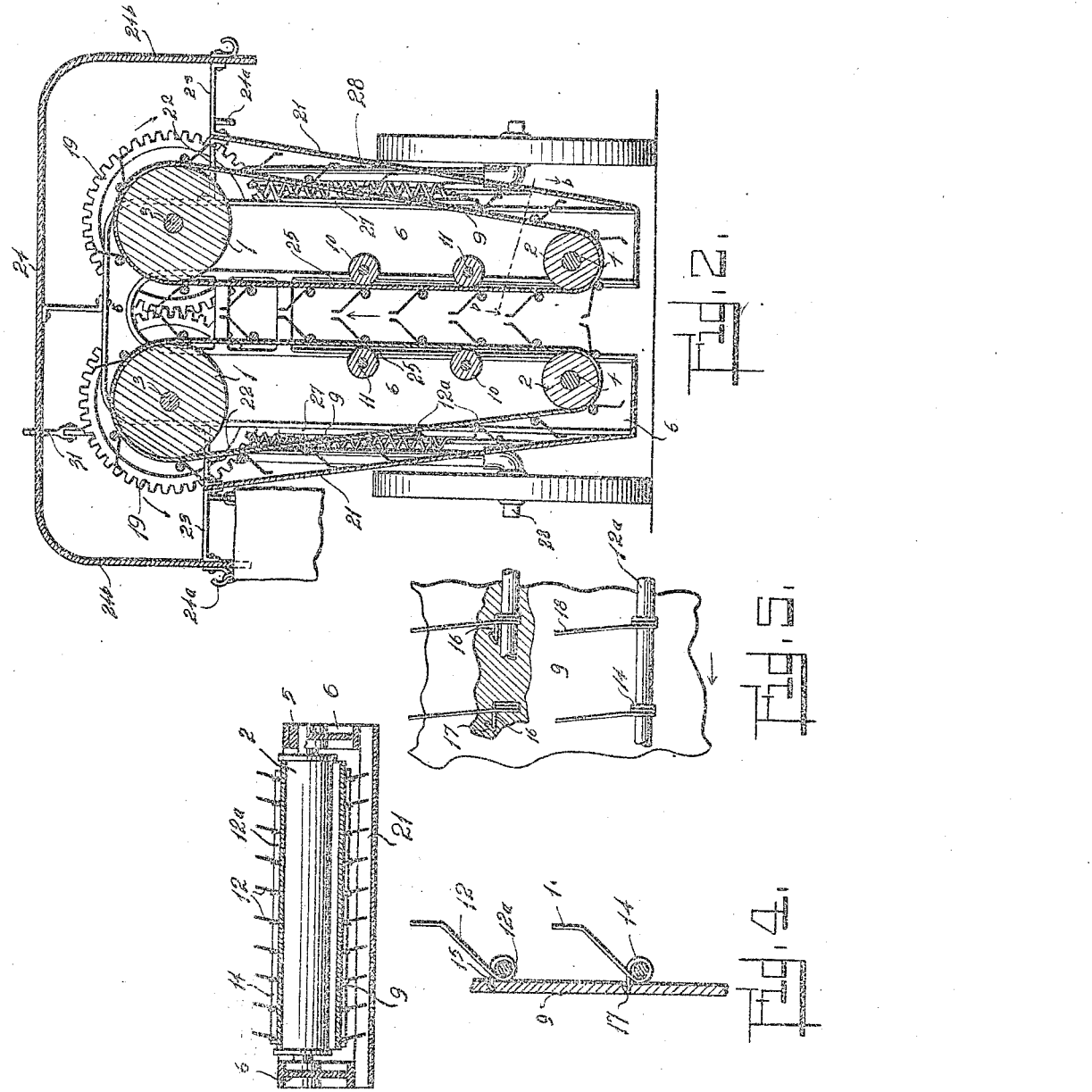

THOMAS MATLOCK, OF MARSHALL, ARKANSAS, ASSIGNOR OF ONE-HALF TO CHAS. L. BOUGHNER, OF ST. JOHN, KANSAS.

COTTON-PICKING MACHINE.

1,147,961.

Specification of Letters Patent.   Patented July 27, 1915.

Application filed April 20, 1914. Serial No. 833,016.

*To all whom it may concern:*

Be it known that I, THOMAS MATLOCK, citizen of the United States of America, residing at Marshall, Arkansas, have invented certain new and useful Improvements in Cotton-Picking Machines, of which the following is a specification.

This invention relates to new and useful improvements in cotton pickers and typifies in particular a highly improved form of cotton picking mechanism.

The invention typifies a highly improved form of cotton picking mechanism which conception and use is separate and distinct from the horse drawn wheeled carriage frame with which it is correlated. For illustration the invention is here presented in connection with a particular form of carriage, which carriage has its principles, merits and elements of utility set out in a separate application for United States Letters Patent, said application being that one filed April 20, 1914, Serial Number 833015 and entitled Cotton harvester, which application embodies a particular form of wheeled carriage adaptable to mount and carry the mechanism herein claimed.

The invention involves a mechanism mounted upon the carriage referred to, but not necessarily receiving its motive power therefrom. In this instance it is preferable to adapt the invention and illustrate same to receive its motive power for operation from some external form of prime mover, such as a gas engine; the same forming no part of this invention is not here shown.

An object of the invention is to provide a form of belted picking mechanism which will readily pass through the rows of cotton, leaving the plants and unopened bolls undisturbed and undamaged, and one which will require an expenditure of a minimum energy to drive said mechanism.

A further object is to provide a form of belted mechanism which embodies therein a plurality of resilient picking fingers fixed to the belt, the whole forming an amassed and netted system of fingers which will thoroughly, positively and delicately traverse and pass between the stalks and plants relieving same of its fibered product.

A further object resides in the particular form and disposition of the picking fingers, said picking fingers having a surface and direction contour which renders them most efficient in accomplishing their purpose. Features also reside in a particular form of bracing and reinforcing of the said picking fingers.

A still further object is to produce a machine of the character described which will be inexpensive and simple in construction, strong and durable in operation and whose few working parts will be unlikely to get out of working order.

With these and other objects in view, the invention has relation to a certain arrangement and combination of parts, an example of which is illustrated in the accompanying drawings, described in the following specification and subsequently embodied in the appended claims.

Figure 1 is an inside elevational view of the cotton picking mechanism correlated with a wheeled carriage, some parts thereof being illustrated in section. Fig. 2 is a vertical longitudinal view of the mechanism in sectional detail, the section being taken upon the line $a$—$a$ of Fig. 1. Fig. 3 is a sectional view taken upon the line $b$—$b$ of Fig. 2. Fig. 4 is a view in sectional elevation of a portion of the fingered belt. Fig. 5 is a view in front elevation of Fig. 4, a portion thereof being shown in section. Said Figs. 4 and 5 illustrate the particular form, shape and direction of the picking fingers.

Referring now more in particular to the drawings, wherein the same elements are designated by identical numerals, 1 and 2 respectively designate upper and lower belt rollers. Said rollers are arranged in pairs, and horizontally supported. The rollers are carried by shafts 3 and 4 respectively, said shafts having their extremities journaled in bearings 5 integral with a pair of vertically arranged arched frame support members 6.

The upper rollers 1 will preferably have an increased diameter over the lower ones. In such case the shaft centers which carry the two rollers will not be vertically alined, but offset sufficiently to tangentially aline the peripheries of the two rollers.

The frame support member 6 is formed substantially heavy, and will preferably be of cast metal having strengthening webs, flanges, and journal boxes cast integral therewith substantially as illustrated.

Diagonal brace members 7, as well as correlated parts later mentioned, brace in a spaced relation the frame support members 6. The extremities of said braces are bolted to the vertical webs of the support members 6.

Endless belts 9 are carried by the rollers 1 and 2. The arrangement of the said pulleys as described brings the adjacent halves of the belt in vertical parallel proximity. Guide rollers 10 are provided on the inside of the vertical half of the belt and journaled upon shafts 11, substantially as the rollers 1 and 2 are journaled in the frame member 6. Said rollers have their peripheries tangent to the belts 9 and are adapted to roll under the traveling stress imparted them from said belt. Said guide rollers are adapted to keep the contacting side of the belt in a substantially vertical alinement and resist any inward pressure or tendency which may be impressed thereon by the plants which will later be seen to pass through the opening of the arched frame members and through the substantially narrow opening between the vertical halves of the belt.

Referring in particular to Figs. 4 and 5 the endless belt is seen to be provided with a plurality of resilient picker fingers 12. Said fingers form an important part of this invention; in particular does the shape, form and manner of fixing the finger to the belt have to do with the invention. The finger is preferably formed and made of high carbon steel wire, which is strong and durable, yet elastic and flexible in action. The body 12 of the finger is coiled a number of times, adjacent to the belt, as indicated by the numeral 14 and passed through the belt on a horizontal plane as indicated by the numeral 15. The body 15 is then bent at right angles and impressed flush with the surface of the belt, as shown by numeral 16. Said portion 16 is further turned and passed through the belt in the form of a hook 17. This gives a firm, substantial and permanent hold of the finger on the belt. The finger is fixed to the belt with its free extremity outwardly directed at an angle. The extremity 18 of the body is turned at an angle with said body 12, the disposition of the finger is such that, when the vertical half of the belt is reached the body 12 assumes an inclined angle preferably of about forty five degrees while the extremity 18 is vertically disposed. Further describing the disposition of the fingers on the belt, Fig. 5 clearly illustrates the fingers having their free extremities forwardly directed with respect to the direction of travel, said direction of travel being indicated by the arrow, of the wheeled carriage on the ground.

The belts 9 should carry a number of the picker fingers described, in this instance said fingers are arranged in vertical and horizontal rows but to arrange them in miscellaneous and irregular manner upon the belt would in no wise and in no manner be a departure from the principle and spirit of the invention.

In the regular arrangement substantially as illustrated finger rods 12ª are inserted through the coils 14 of the picker fingers and extend in length practically the width of the belt, and are held in position by any convenient means such as inserting a cotter pin in the rod at each extremity. These rods brace and strengthen laterally the fingers and prevent them from twisting on the belt. Said rods should be slightly less in diameter than the inner diameter of the coils 14, this allows free contraction of the coil when the finger is brought under tension. The rods will preferably be light weight wood or tubing.

The forward extremities of the shafts 3 carry fixed thereupon spur gears 19, intermeshing and one adapted to be driven by the other. One of the shafts is extended and has fixed thereto a flange or coupling 20 which is adapted to receive and attach therewith, a clutch or universal coupling of the motive power (not shown). The power will be applied in such a direction as to cause the adjacent vertical picking sides of the belt to travel upward.

Finger or belt guards 21, comprising substantially rectangular sheet metal sides are attached to the under surface of the extremities of the frame members and extend upwardly at an angle, adjacent to and parallel to the line of travel of the picker fingers. These guard members protect and incase the belted finger element from the overhanging cotton stalks of the adjacent rows. Arms 22 fixed to the frame carry and hold in spaced relation the guards 21.

Arms 23 are fixed to the belt guards and support and carry a protective bonnet 24. Sack hooks 24ª are provided about the lower portion and opening of the bonnet and adapted to carry an open cotton sack on either or both sides during the operation of the machine. A sack, with lower portion broken away, is illustrated in Fig. 2. The vertical down turned walls 24ᵇ of the bonnet form guide ways for the cotton which will be seen to take the course of the arrows within the hood and be disposed in a sack provided.

A cotton guide hood 25 substantially forms the forward portion of the machine. The hood is flared out and rounded as indicated by the numeral 26. The walls extend rearward and attach to the forward frame member 6. This construction guides the cotton plant to the desired place and holds same in a straight and upright manner as the said plant enters the belted picking mechanism. Carriage plates 27 are fixed to the forward end of the hood and extend rearward and attach to the outer flanges of the frame support member 6.

An arched wheeled axle 28 is carried by arms 29, said arms being fixed to the square extremities of a transversely mounted shaft 30. One of the arms 29 is integral with a hand lever 31. Coiled equilizing springs 32 are provided, said springs having their extremities attached to the frame of the machine and adjacent to the arched axle. Said springs are adapted to equalize the pull and weight of the machine when adjusting the height of the machine from the ground.

The hand lever and rack 33 is provided for controlling the horizontal balance of the machine upon the axle 28. The transverse shaft 34 carries a pair of slotted arms 35, one on either side of the machine. An arm member 36 is pivoted at 37 and has a vertical slotted connection with the axle adjacent to the ground wheel. A pin 38 is fixed to the member 36, and passes through slots 35ª of the arms 35, which adapts said member to be pivoted about its pivotal point 37 by adjustment of the hand lever. This gives a forward and rearward adjustment of the wheels and adapts the machine to be properly balanced. A draft tongue 39 is provided.

In the operation of the machine the motive power will propel, as described, the belted mechanism as the machine is passed along the cotton row. The stalk and plants are guided into the belted pickers, the fingers passing through and removing the fiber from the stalk. The endless belt will travel sufficiently fast to centrifugally throw the cotton from the fingers when the said fingers pass over the upper pulley. The bonnet and the vertical walls of said bonnet form a suspension for the cotton sack and guideway for the cotton to be projected from the traveling belt to the sack.

It will be understood that the picker teeth, their form and disposition upon the belt are adaptable to be used in connection with any form of rolling picker member such as a parallel slatted or belt member.

The angular direction of the fingers upon the belt, adapts said fingers to travel through the plants in the most efficient way possible, the slight angle forward compensating for, in the vertical travel, the broadside action the fingers would have against the cotton boll and lock if such angular direction was not provided.

The invention is presented as including all such modifications and changes as will properly come within the scope of the following claims.

Claims:

1. In a cotton picking machine, the combination of a pair of arched frame members, rollers journaled in the frame members, spaced endless belts carried by the rollers and adapted to travel vertically, the direction of travel of the opposed working faces of the belts being upward and substantially parallel, flexible picker fingers carried by the belts, said picker fingers having their free extremities projected upwardly and at an angle away from the working face of the belts and also forwardly at an angle with respect to the direction of travel of the carriage along the row, provision for mounting a receptacle adjacent to the belts and aprons adapted to guide the plants toward the belts.

2. In a cotton picking machine, the combination of a pair of arched frame members, rollers journaled in the frame members, spaced endless belts carried by the rollers and adapted to travel vertically, the direction of travel of the opposed working faces of the belts being upward and substantially parallel, flexible picker fingers carried by the belts, said picker fingers having their free extremities projected upwardly and at an angle away from the working face of the belt and also forwardly with respect to the direction of travel of the carriage along the row, means for bracing or reinforcing each picker finger, a protective bonnet surmounting the upper portion of the mechanism, provision for mounting a receptacle adjacent to the belts, and aprons adapted to guide the plants to the machine.

3. In a cotton picking machine, a pair of arched frame members, rollers journaled in the frame members, spaced endless belts carried by the rollers adapted to travel vertically, the direction of travel of the opposed working faces of the belts being upward and substantially parallel, picker fingers carried by the belts, a coil formed on each picker finger, reinforcing rods correlated with the coils of the rows of the picker fingers, a protective hood surmounting the elements recited and aprons adapted to guide the plants to the machine.

4. In a cotton picking machine, a pair of arched frame members, rollers journaled in the frame members, spaced endless belts carried by the rollers and adapted to travel vertically, the opposed working faces of the belts having an upward direction of travel and being substantially parallel, flexible picker fingers in rows carried by the belts, said picker fingers having their free extremities forwardly directed at an angle with respect to the travel of the carriage along the row and also projected upwardly at an angle away from the working face of the belts, reinforcing rods correlated with the rows of picker fingers, a protective bonnet surmounting the upper portion of the mechanism, and aprons adapted to guide the plants to the machine.

5. In a cotton picking machine, a pair of arched frame members, rollers journaled in the frame members, spaced endless belts adapted to travel vertically carried on the rollers, the direction of travel of the opposed working faces of the belts being upward and substantially parallel, picker fingers arranged in rows on the belts, a coil formed on each picker finger and rods carried by the coils of said picker fingers.

6. In a cotton picking machine, a pair of arched frame members, rollers journaled in the frame members, spaced endless belts adapted to travel vertically carried by the rollers, the direction of travel of the opposed working faces of the belts being upward and substantially parallel, picker fingers carried by the belts, a coil formed on each picker finger, said picker finger passing through the belt and bent back flush with the rear surface of said belt, and reinforcing rods carried by the coils of the fingers.

7. In a cotton picking machine, a pair of arched frame members, rollers journaled in the frame members, spaced endless belts adapted to travel vertically carried by the rollers, picker fingers carried by the belts, said picker fingers having their free extremities disposed forwardly at an angle with respect to the direction of travel of the carriage along the row and also projected upwardly at an angle away from the working face of the belts, coils formed on the picker fingers and reinforcing rods correlated with the coils of the picker fingers.

8. In a cotton picking mechanism, a belt, flexible fingers in rows carried by the belt, said picker fingers having their free extremities projected forwardly at an angle upon the belt and also at an angle away from the belt, a coil formed on each finger, rods passing through the coils, one extremity of each finger passing through the belt and bent flush with the rear surface of the belt, and a hook formed on the other extremity of each finger.

In witness whereof, I affix my signature in the presence of two witnesses.

THOMAS MATLOCK.

Witnesses:
  R. H. TOMPKINS,
  CHAS. L. BOUGHNER.